July 11, 1967 G. BOGNER 3,331,041
SUPERCONDUCTOR DEVICE FOR SHIELDING
OR COLLECTING MAGNETIC FIELDS
Filed April 21, 1965

United States Patent Office 3,331,041
Patented July 11, 1967

3,331,041
SUPERCONDUCTOR DEVICE FOR SHIELDING OR COLLECTING MAGNETIC FIELDS
Günther Bogner, Erlangen, Germany, assignor to Siemens-Schuckertwerke Aktiengesellschaft, Berlin-Siemensstadt, Germany, a German corporation
Filed Apr. 21, 1965, Ser. No. 449,762
Claims priority, application Germany, Apr. 25, 1964, S 90,782
4 Claims. (Cl. 335—216)

My invention relates to superconductor structures for shielding, confining or collecting magnetic fields.

Magnetic fields of very high intensity can be shielded or collected by means of sheets, plates, hollow cylinders and similar structures of hard superconductor material in which loss-free continuous currents are induced by an external magnetic field. For a given constant temperature, the shielding or collecting capacity increases, in theory, with the thickness of the superconducting structures and is upwardly limited by the so-called critical condition which is reached when each macroscopic region of the superconducting body carries the maximal or critical current density determined by the local magnetic field in this region.

In practice, however, the theoretically expected high shielding or collecting capacities are not achieved if the superconducting structures have a relatively large thickness. This is because, with a variation of the externally applied magnetic field, the magnetic flux in a thick body of hard superconductor material often varies not continuously but abruptly at certain localities of the superconductor. There occurs the so-called "flux-jump effect." The flux jumps are accompanied by local heating, which results in interfering or destroying the continuous current flow. The shielding or collecting body of hard superconductor material then partially converts for short intervals of time to normal conductance at relatively low external magnetic fields and thus loses its shielding or collecting ability.

It is an object of my invention to provide a device of hard superconductor material for shielding or collecting magnetic fields, in which the disturbing influence of flux jumps is eliminated, so that the device is suitable for reliably shielding, confining or collecting magnetic fields of very high intensities.

According to the invention, the superconductor device is formed of hard superconductor material and also of heat-dissipating means consisting of good heat-conducting normal-conductance metal in heat-conducting contact with the superconduction material and wholly or partially surrounded by, or embedded in, the superconductor material.

By virtue of the good heat-conducting metal situated within the shielding or collecting bodies of hard superconductor material, there is afforded a rapid dissipation of the heat generated in the event of flux jumps in the superconductor material. As a result, appreciable temperature increases in the superconductor material are prevented. This requires arranging the normal-conductance metal within the superconductor material in such a manner that it does not interrupt the current paths of the loss-free continuous currents initiated by external magnetic fields within the superconductor material.

Suitable for the purpose of the invention are hard superconductors having high critical magnetic fields, for example alloy superconductors such as niobium-zirconium or niobium-titanium alloys, or intermetallic superconducting compounds, for example niobium-tin, vanadium, gallium or vanadium-silicon. Particularly suitable as a good heat conducting, normal-conductance metal is copper. However, other metals of good heat conductance are also applicable, for example gold.

Devices according to the invention for shielding or collecting magnetic fields may be given a great variety of different geometric shapes depending upon the particular use intended. For example, they may be shaped as planar plates, as hollow cylinders, or as cylinders with twin bores such as those employed by Swartz and Rosner in the flux pump described in Journal of Applied Physics, vol. 33 (1962), pages 2292 to 2300.

The normal-conductance metals in devices according to the invention may be arranged in the form of sheets, for example. According to one preferred embodiment, a shielding plate is composed of laminations, namely of alternating plates or sheets consisting of normal-conductance metal and superconducting material respectively. Analogously, hollow cylinders are formed, for example, of coaxial hollow cylinders consisting alternately of normal-conductance sheet material and sheets of superconducting material. The normal-conductance sheets in such devices are preferably provided with slits to minimize or virtually prevent the occurrence of eddy currents.

For securing a good dissipation of heat, it is particularly favorable to have the normal-conductance sheets protrude beyond the structure of superconductor material on one or more sides of the device. The cooling vanes formed by the protruding portions of the normal-conductance sheets may then be contacted by a flow of cryogenic medium, such as a bath of liquid helium.

In another embodiment of the invention, tubes of good heat-conducting normal-conductance metal are provided within the structure of superconducting material. The embedded tubes are then available to be traversed by cryogenic medium, such as liquid helium.

In other embodiments of the invention, the normal-conductance metal is irregularly distributed within the structure of superconducting material. For example, the superconducting body of intermetallic compound may be shaped as a sinter body and the pores as well as any hollow spaces in the body may be filled with copper or gold. This considerably increases the effective heat conductance of the device. Such a distributed arrangement of the normal-conductance metal is particularly advantageous in cases where the device is shaped as a cylinder with a double bore to serve as part of a flux pump, if the insertion of normal-conductance sheets is infeasible or too difficult for geometrical reasons.

The invention will be further explained with reference to the accompanying drawings showing by way of example a number of different devices according to the invention.

FIG. 2b illustrates a longitudinal section through the hollow cylinder according to FIG. 2a.

Figure 1:
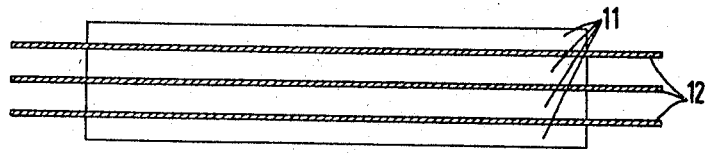
FIG. 1 illustrates schematically and partly in section a shielding plate.

The shielding plate shown in FIG. 1 is composed of individual layers 11 of hard superconducting material such as niobium-tin alloy. The individual layers are separated by sheets 12 of copper. The copper sheets 12 have slits corresponding to those denoted by 23 in FIG. 2a. The slits of each sheet are preferably displaced from the slits of the next following sheet to prevent an appreciable reduction in heat dissipation by the totality of slits. The copper sheets protrude on both sides beyond the plates 11 of superconducting material.

In an embodiment of a shielding plate according to FIG. 1, the superconductor layers 11 were made of niobium-25 zirconium. These superconductor sheets were alternately stacked with copper sheets. A firm bond between all of the sheets can be readily produced by rolling or by temperature treatment causing the layers to fuse together. A suitable heat treatment, for example, is to heat the stack for about 30 minutes at about 600° C.

In another embodiment of a shielding plate corresponding to FIG. 1, the superconductor layers 11 were formed of sintered plates of superconducting intermetallic compounds, such as sinter plates of niobium-tin. A good heat contact between these plates and the copper sheets is obtained by pressing the entire stack and simultaneously applying a heat treatment. In this case, the stack may be heated, for example, for 1 to 2 hours at about 900 to about 1000° C. It suffices for good heat dissipation to employ copper sheets whose thickness is related to the thickness of the superconducting plates in accordance with the ratio of 1:1 to 1:5.

Another way, according to the invention, of producing a shielding plate, as exemplified in FIG. 1, is to produce or precipitate layers of superconducting material upon metallic supports, such as the metal sheets denoted by 12 in FIG. 1. This method is performed, for example, as follows. When employing a metal sheet consisting of, or coated with, niobium, a layer of superconducting niobium-tin is produced on the niobium substrate either by diffusion or by precipitation with the aid of a gaseous-phase reaction. Other intermetallic compounds may be produced by in-diffusion or by precipitation from the gaseous phase upon suitable metal support structures in an analogous manner.

Figure 2A:
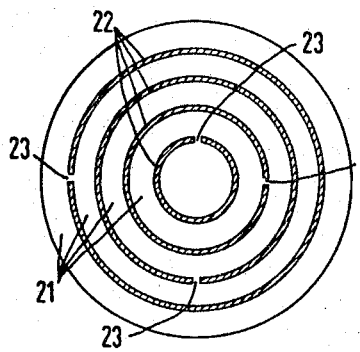
FIG. 2a shows schematically and in section a hollow-cylindrical device according to the invention.
Figure 2B:
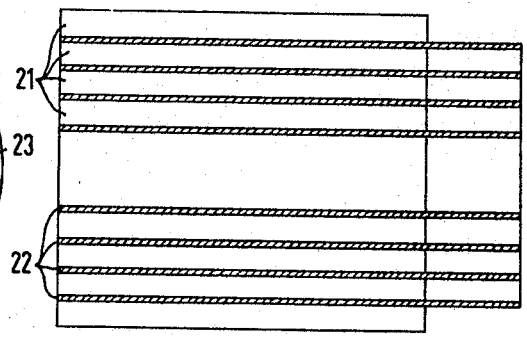

The hollow cylindrical structure according to the invention illustrated in FIGS. 2a and 2b is suitable for the shielding, collecting or confining of high-intensity magnetic fields. The hollow structure comprises several hollow cylinders 21 of respectively different diameters located coaxially within one another and consisting of hard superconducting material, for example sintered niobium-stannate. This material is machinable on a lathe. Disposed between the individual hollow cylinders 21 of superconducting material are cylinders 22 of slitted copper sheets. Some of the slits are visible in FIG. 2a and denoted by 23. They may extend parallel to the cylinder axis and are located alternately on respectively different diameters. The slits prevent or minimize the generation of eddy currents and facilitate inserting the copper cylinders. The dimensions of the cylinders 21 and 22 are such that the cylinder surfaces are in intimate heat-conducting contact with each other. A good heat contact between the cylinders is also obtainable, or is improved, by subjecting the entire composite structure to a heat treatment as described above, to obtain some fusion between the mutually engaging surfaces. The copper cylinders protrude beyond the niobium-tin cylinders at one or both end faces of the superconducting components, this being apparent from FIG. 2b. The wall thicknesses of the niobium-tin cylinders and of the copper cylinders have the ratio of 3:1, for example. The superconducting material in a hollow cylindrical structure may also be produced in form of superconducting layers grown or precipitated on metallic supporting members as described with reference to the flat shielding plate of FIG. 1.

Figure 3:
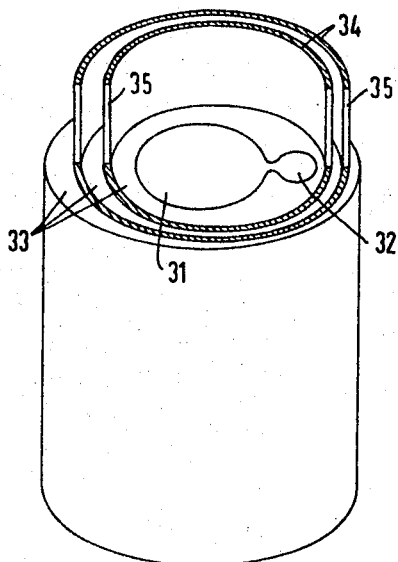
FIG. 3 illustrates schematically in perspective and partly in section a cylindrical device having a double bore.

The cylindrical structure shown in FIG. 3 has two circular bores parallel to the cylinder axis and merging with each other. According to Swartz and Rosner, such a cylinder is applicable for flux compression and then operates to catch magnetic fields in the superconducting material. According to the invention, the cylinder structure is built up of coaxial tubes 33 formed of hard superconductor material, for example sintered niobium-tin, and intermediately located slitted copper tubes 34, some of the slits being located at 35. The portions of the copper tubes 34 that protrude beyond the superconducting tubes 33 are shown sectioned. The copper tubes 34 surround both bores 31 and 32 so that the circular currents produced in the superconducting material are not interrupted by normal-conductance material. A good heat contact of the tubes, tightly fitted into each other, is reliably secured by subjecting the structure to the above-mentioned heat treatment.

Figure 4:
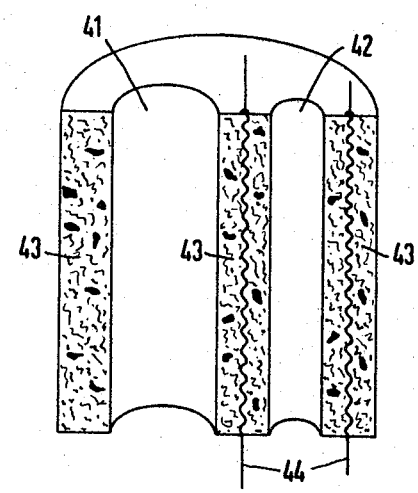
FIG. 4 shows schematically and in section a device containing normal-conductance metal distributed at random within the superconducting material of the structure.

In the embodiment of FIG. 4, the good heat conducting normal-conductance metal is used in comminuted form and irregularly distributed throughout the body of hard superconductor material. The illustrated cylindrical body consists of a sintered structure with two bores 41, 42 of respectively different diameters. Electric heater wires 44 pass through the body. Such a structure is suitable for successive flux pumping (Elleman and Hildebrandt, Proceedings of the 8th Internat. Conference on Low Temperature Physics, London, published by Butterworths, 1963, page 332). The sintered body consists, for example, of the intermetallic compound niobium-tin. The pores and hollows 43 within the sintered body are filled with normal-conductance metal, namely copper or gold. The metal is added to the body by admixing the normal-conductance metal as a powder or in the form of small wire pieces to the comminuted superconductor material prior to shaping and sintering the body.

Devices according to the invention, of course, may contain a number of superconductor layers and normal-conductance metal sheets other than exemplified by the illustrated embodiments. The plates or cylinders may be provided at their outer surface with a further layer or sheet of good heat-conducting normal-conductance metal. Such a surface layer may be produced by vapor deposition, electrolytically or any other metallizing process. Such and other modifications will be obvious to those skilled in the art and are indicative of the fact that my invention may be given embodiments other than particularly illustrated and described herein, without departing from the essential features of my invention and within the scope of the claims annexed hereto.

I claim:

1. A superconductor device for shielding or collecting magnetic fields, comprising structure of hard superconductor material, and sheet members of good heat-conducting, normal-conductance metal heat-conductively bonded with said superconducting material and at least partly embedded therein, said sheet members of normal-conductance metal having slits for minimizing eddy currents.

2. A superconductor device for shielding or collecting magnetic fields, comprising structure of hard superconductor material, and sheet members of good heat-conducting, normal-conductance metal heat-conductively bonded with said superconducting material and at least partly embedded therein, said sheet members of normal-conductance metal having greater length than said structure of hard super-conducting material and protruding beyond said structure on at least one side thereof.

3. A superconductor device for shielding or collecting magnetic fields, comprising structure of hard superconductor material, and heat dissipation means formed of good heat-conducting, normal-conductance metal in heat-conducting contact with said superconductor material and at least partially enveloped therein, said heat dissipation means of normal-conductance metal being formed of particles of random distribution embedded in said superconducting material.

4. A superconductor device for shielding or collecting magnetic fields, comprising structure of hard superconductor material, and heat dissipation means formed of good heat-conducting, normal-conductance metal in heat-conducting contact with said superconductor material and at least partially enveloped therein, said structure of superconducting material forming a sintered porous body, and said normal-conductance metal filling the pores of said sintered body.

References Cited

UNITED STATES PATENTS 3,187,235  6/1965  Berlincourt et al.
3,214,249  10/1965  Bean et al.

OTHER REFERENCES

IBM Technical Disclosure Bulletin, Vol. 3, No. 11, April 1961. Page 49 relied on.

BERNARD A. GILHEANY, *Primary Examiner.*

G. HARRIS, JR., *Examiner.*